(12) United States Patent  
Szucs

(10) Patent No.: US 12,255,933 B2  
(45) Date of Patent: Mar. 18, 2025

(54) TERMINAL DEVICES, INFRASTRUCTURE EQUIPMENT AND METHODS

(71) Applicants: Sony Group Corporation, Tokyo (JP); Sony Europe B.V., Surrey (GB)

(72) Inventor: Paul Szucs, Basingstoke (GB)

(73) Assignees: Sony Group Corporation, Tokyo (JP); SONY EUROPE B.V., Surrey (GB)

( * ) Notice: Subject to any disclaimer, the term of this patent is extended or adjusted under 35 U.S.C. 154(b) by 0 days.

(21) Appl. No.: 17/546,077

(22) Filed: Dec. 9, 2021

(65) Prior Publication Data

US 2022/0103601 A1 Mar. 31, 2022

Related U.S. Application Data

(63) Continuation of application No. PCT/EP2020/078566, filed on Oct. 12, 2020.

(30) Foreign Application Priority Data

Oct. 18, 2019 (EP) .................................... 19204190

(51) Int. Cl.
*H04L 65/1066* (2022.01)
*H04L 65/1059* (2022.01)

(52) U.S. Cl.
CPC ...... *H04L 65/1066* (2013.01); *H04L 65/1059* (2013.01)

(58) Field of Classification Search
None
See application file for complete search history.

(56) References Cited

U.S. PATENT DOCUMENTS

| 2007/0160208 | A1 | 7/2007 | MacLean et al. |
| 2009/0300241 | A1 | 12/2009 | Young et al. |
| 2015/0106531 | A1 | 4/2015 | Nanjegowda |
| 2016/0044099 | A1* | 2/2016 | Oyman ................. H04L 65/613 709/219 |

OTHER PUBLICATIONS

3rd Generation Partnership Project; 3GPP Ts 26.501 V16.1.0 (Sep. 2019) Technical Specification Group Services and System Aspects; 5G Media Streaming (5GMS); General description and architecture. (Year: 2019).*

Sony Europe B V: "5GMS3, 5GMSA, FLUS harmonisation", 3GPP Draft; S4-AHI849 5GMS3A FLUS Harmonisation, 3rdGeneration Partnership Project (3GPP), Mobilecompetence Centre ;65 0, Route Des Lucioles ;F -06921Sophia-Antipolis Cedex; France,vol. SAW G4, no. ;Sep. 25, 2019 Sep. 24, 2019 (Sep. 24, 2019).* XP051811006. Retrieved from the Internet:U RL: https://ftp.3gpp.org/tsg_sa/WG4_CODEC/Ad-hoc_MBS/Docs_AHI/S4- AHI849.zip S4-AHI849 5GMS3A FLUS harmonisation.doc[retrieved on Sep. 24, 2019].

(Continued)

*Primary Examiner* — Angela Nguyen

(74) *Attorney, Agent, or Firm* — XSENSUS LLP

(57) ABSTRACT

A terminal device comprising: transceiver circuitry configured to communicate with infrastructure equipment; and processing circuitry configured to control the transceiver circuitry to: receive, from the infrastructure equipment, a media content stream via a media interface; and receive a remote control instruction via the media interface.

25 Claims, 14 Drawing Sheets

(56) References Cited

OTHER PUBLICATIONS

Sony Europe B V: "5GMSA high-level architecture",3GPP Draft; S4-AH1856 5GMSA High-Level Architecture, 3rd Generation Partnership Project (3GPP), Mobilecompetence Centre ;65 0, Route Des Lucioles ;F -06921 Sophia-Antipolis Cedex; France, vol. SA WG4, no .; Oct. 9, 2019 Oct. 8, 2019 (Oct. 8, 2019). XP051811013, Retrieved from the Internet: U RL: https://ftp.3gpp.org/tsg_sa/WG4_CODEC/Ad-hoc_MBS/Docs_AHI/S4-AHI856.zip S4-AHI856 Sgmsa high-level architecture.doc[retrieved on Oct. 8, 2019].
International Search Report and Written Opinion mailed on Mar. 5, 2021, received for PCT Application PCT/EP2020/078566, Filed on Oct. 12, 2020, 22 pages.
3GPP, "System Architecture for the 5G System (5GS); Stage 2 (Release 16)", 3GPP TS 23.501, V16.2.0, Sep. 2019, 391 pages.
3GPP, "5G Media Streaming (5GMS); General description and architecture (Release 16)", 3GPP TS 26.501, V16.1.0, Sep. 2019, 35 pages.
Holma et al., "LTE for UMTS OFDMA and SC- FDMA based radio access", John Wiley and Sons, 2009, 232 pages.
Gabin et al., "5G Media Streaming Architecture", Available Online at: https://www.ibc.org/download?ac=10428, Oct. 17, 2019, 9 pages.
NEC Display Solutions Retail, https://www.nec-display-solutions.com/p/uk/en/solutions/retail.xhtml, Jan. 2019, pp. 1-11.
TDM Digital Signage, "New Generation Digital Signage Narrowcasting Software from TDM", Feb. 2, 2016, www.tdmsinage.com, pp. 1-9.
Sony Professional Products, "TDM-DS1Y/TDM-DS3Y Tdm digital signage for BRAVIA displays", https://pro.sony/en_GB/products/display-software/tdm-ds1y-tdm-ds3y, Retrievable Mar. 2018, pp. 1-22.
TDM Digital Signage, "TDM Designer Manual 1.6", Aug. 3, 2016, pp. 1-41.

* cited by examiner

TERMINAL DEVICES, INFRASTRUCTURE EQUIPMENT AND METHODS

CROSS-REFERENCE TO RELATED APPLICATIONS

This application is a continuation of PCT filing PCT/EP2020/078566, filed Oct. 12, 2020, and claims priority to European Application No. 19204190.3, filed Oct. 18, 2019, the entire contents of each are incorporated herein by reference.

BACKGROUND

Field of Disclosure

The present disclosure relates to terminal devices infrastructure equipment and methods.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to routinely and efficiently support communications with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

Other types of device, for example supporting high-definition video streaming, may be associated with transmissions of relatively large amounts of data with relatively low latency tolerance. Yet other types of device, for example used for autonomous vehicle communications, may be characterised by data that should be transmitted through a network with very low latency and very high reliability. A single device type might also be associated with different data traffic profiles/characteristics depending on the application(s) it is running For example, different consideration may apply for efficiently supporting data exchange with a smartphone when it is running a video streaming application (high downlink data) as compared to when it is running an Internet browsing application (sporadic uplink and downlink data) or being used for voice communications by an emergency responder in an emergency scenario.

In view of this there is expected to be a desire for future wireless communications networks, for example those which may be referred to as 5G or new radio (NR) system/new radio access technology (RAT) systems, as well as future iterations/releases of existing systems, to efficiently support connectivity for a wide range of devices associated with different applications and different characteristic data traffic profiles.

One example area of current interest in this regard includes the so-called "5G Media Services Architecture" (5GMSA). This is described in [1]. The 5GSMA is designed to offer a simpler and more modular design enabling services with different degrees of co-operation between Third-Party content and service providers, broadcasters and the like.

However, the inventor has identified improvements that may be made to the current architecture.

Firstly, the current arrangement assumes that the user will control the UE to receive content. Therefore, remote control functionality is provided in the uplink direction only. In other words, it is only possible to send remote control instructions over an established uplink session. However, this assumption is quite limited. However, in the future it may be desirable to send remote control instructions in a downlink direction. This simply is not possible with the current arrangement.

Secondly, the current arrangement has an architecture designed for downlink and a separate, different architecture for uplink. This arrangement results in increased complexity within devices, especially where media will be sent over the 5G network simultaneously over both downlink and uplink channels. For example, in broadcast cameras, it is usual for the captured content to be sent on the uplink channel whilst simultaneously receiving content, such as production output received from the studio, over the downlink channel In other words, it is usual to provide duplex-type operation in broadcast cameras to allow the camera operator to see the production output whilst capturing the content which is sent to the studio.

Thirdly, the current arrangement only provides for pull-mode streaming for downlink media sessions and push-mode streaming for uplink media streaming modes. It would be advantageous to provide push-mode downlink media streaming sessions and pull-mode uplink media streaming sessions.

It is an aim of the present disclosure to address at least one of the above issues.

SUMMARY OF THE DISCLOSURE

The present disclosure can help address or mitigate at least some of the issues discussed above as defined in the appended claims.

Embodiments of the present technique can provide a terminal device comprising: transceiver circuitry configured to communicate with infrastructure equipment; and processing circuitry configured to control the transceiver circuitry to: receive, from the infrastructure equipment, a media content stream via a media interface; and receive a remote control instruction via the media interface.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Long Term Evolution (LTE) Wireless Communications System

Figure 1:
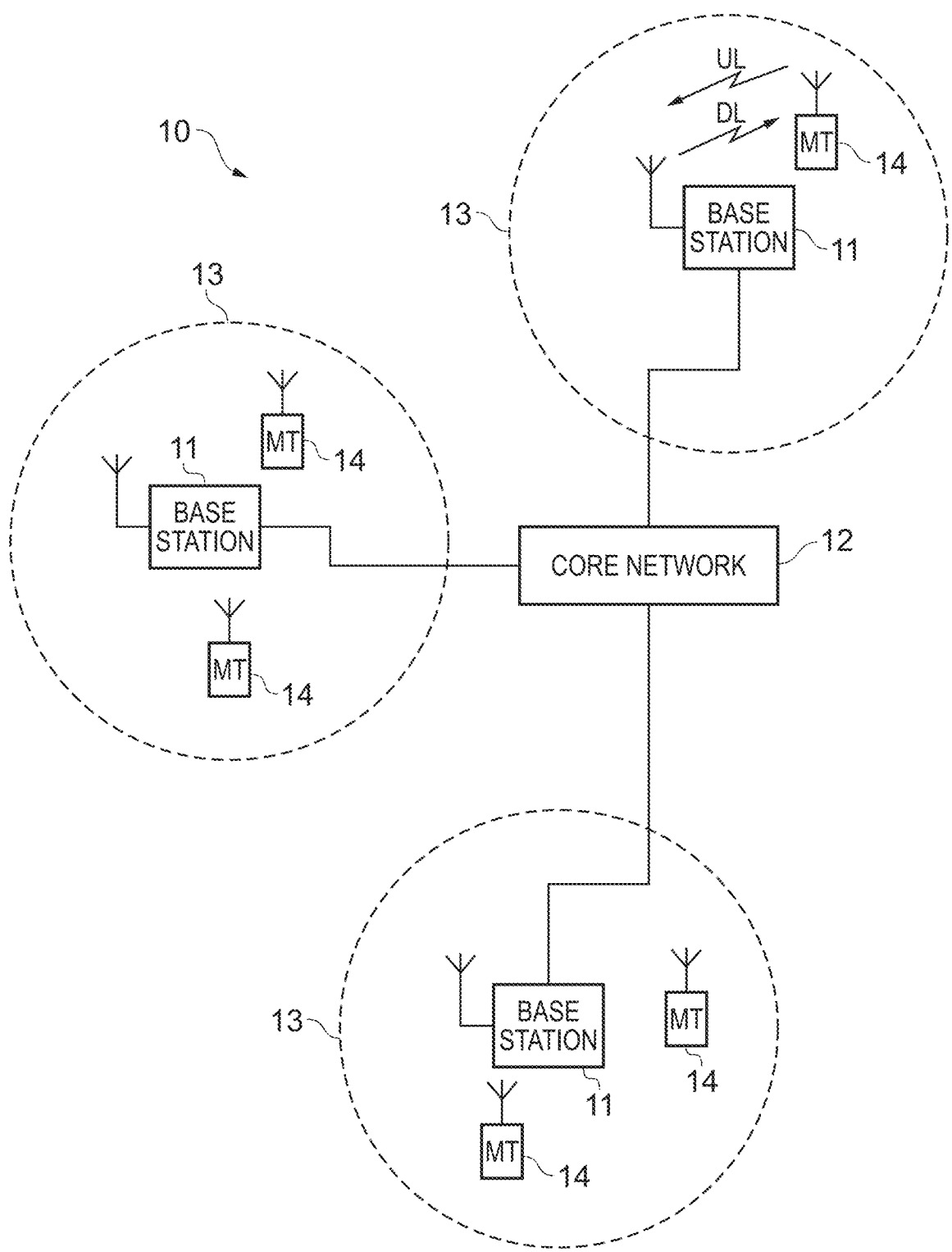
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 10 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [3]. It will be appreciated that operational aspects of the telecommunications (or simply, communications) networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 10 includes a plurality of base stations 11 connected to a core network 12. Each base station provides a coverage area 13 (i.e. a cell) within which data can be communicated to and from terminal devices 14. Data is transmitted from base stations 11 to terminal devices 14 within their respective coverage areas 13 via a radio downlink (DL). Data is transmitted from terminal devices 14 to the base stations 11 via a radio uplink (UL). The core network 12 routes data to and from the terminal devices 14 via the respective base stations 11 and provides functions such as authentication, mobility management, charging and so on. Terminal devices may also be referred to as mobile stations, user equipment (UE), user terminal, mobile radio, communications device, and so forth. Base stations, which are an example of network infrastructure equipment/network access node, may also be referred to as transceiver stations/nodeBs/e-nodeBs/eNBs/g-nodeBs/gNBs and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

As mentioned above, the embodiments of the present invention can find application with advanced wireless communications systems such as those referred to as 5G or New Radio (NR) Access Technology. The use cases that are considered for NR include:
Enhanced Mobile Broadband (eMBB);
Massive Machine Type Communications (mMTC);
Ultra Reliable & Low Latency Communications (URLLC); and
Enhanced Ultra Reliable & Low Latency Communications (eURLLC).

eMBB services are characterised by high capacity with a requirement to support up to 20 Gb/s. URLLC service requires that a packet at layer 2 is transmitted with a latency that is less than 1 ms or 0.5 ms with reliability of 99.999% to 99.9999%.

The elements of the wireless access network shown in FIG. 1 may be equally applied to a 5G new RAT configuration, except that a change in terminology may be applied as mentioned above.

Figure 2:
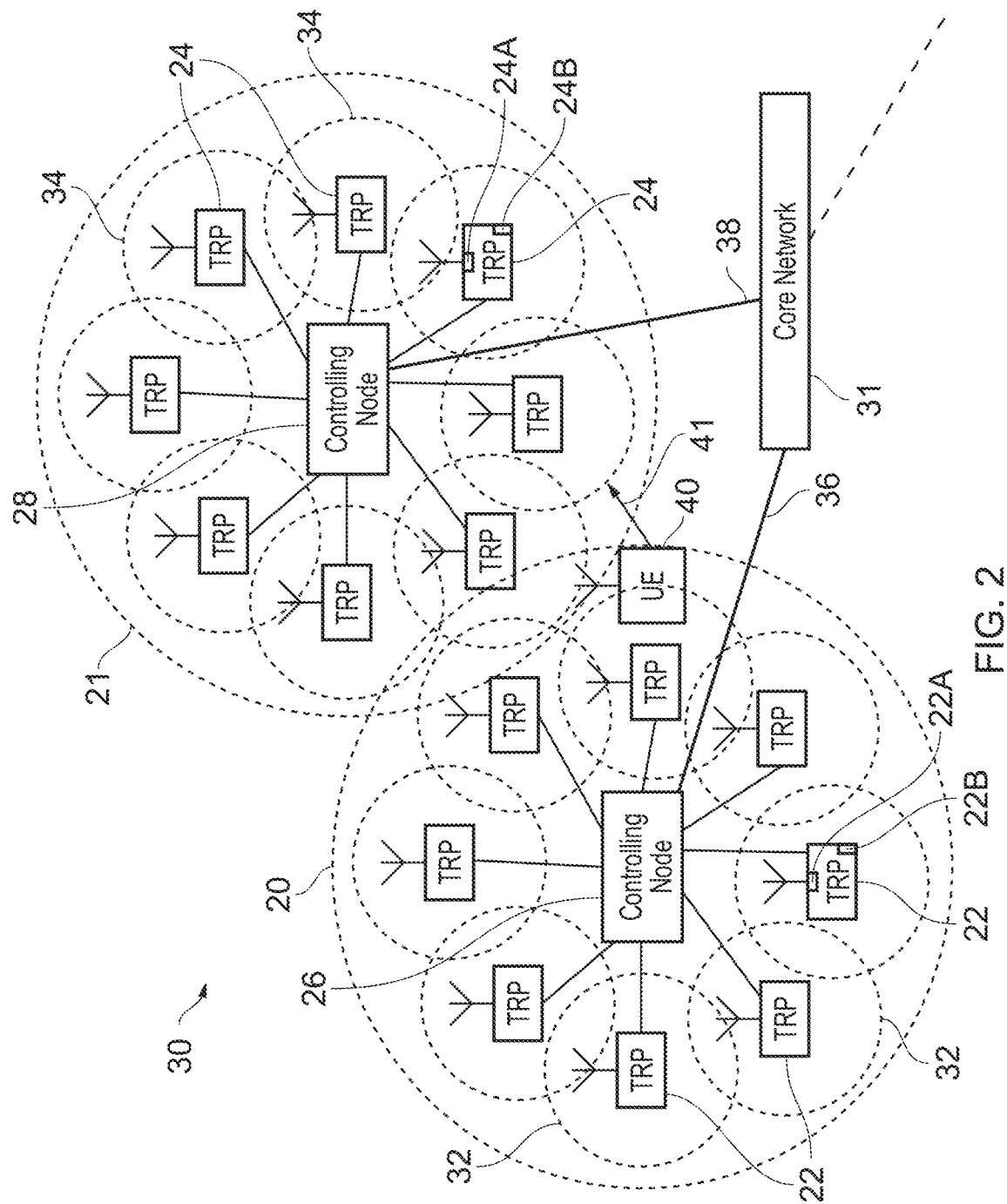
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new RAT wireless mobile telecommunications network/system 30 based on previously proposed approaches which may also be adapted to provide functionality in accordance with embodiments of the disclosure described herein. The new RAT network 30 represented in FIG. 2 comprises a first communication cell 20 and a second communication cell 21. Each communication cell 20, 21, comprises a controlling node (centralised unit, CU) 26, 28 in communication with a core network component 31 over a respective wired or wireless link 36, 38. The respective controlling nodes 26, 28 are also each in communication with a plurality of distributed units (radio access nodes/remote transmission and reception points (TRPs)) 22, 24 in their respective cells. Again, these communications may be over respective wired or wireless links. The distributed units (DUs) 22, 24 are responsible for providing the radio access interface for terminal devices connected to the network. Each distributed unit 22, 24 has a coverage area (radio access footprint) 32, 34 which together define the coverage of the respective communication cells 20, 21. Each distributed unit 22, 24 includes transceiver circuitry 22a, 24a for transmission and reception of wireless signals and processor circuitry 22b, 24b configured to control the respective distributed units 22, 24.

In terms of broad top-level functionality, the core network component 31 of the new RAT telecommunications system represented in FIG. 2 may be broadly considered to correspond with the core network 12 represented in FIG. 1, and the respective controlling nodes 26, 28 and their associated distributed units/TRPs 22, 24 may be broadly considered to provide functionality corresponding to base stations of FIG. 1, and so these terms (as well as indeed eNodeB, eNB, gNodeB, gNB, etc.) are interchangeable. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the terminal devices may lie with the controlling node/centralised unit and/or the distributed units/TRPs.

A terminal device 14 is represented in FIG. 2 within the coverage area of the first communication cell 20. This terminal device 14 may thus exchange signalling with the first controlling node 26 in the first communication cell via one of the distributed units 22 associated with the first communication cell 20. In some cases communications for a given terminal device are routed through only one of the distributed units, but it will be appreciated in some other implementations communications associated with a given terminal device may be routed through more than one distributed unit, for example in a soft handover scenario and other scenarios.

The particular distributed unit(s) through which a terminal device is currently connected through to the associated controlling node may be referred to as active distributed units for the terminal device. Thus the active subset of distributed units for a terminal device may comprise one or more than one distributed unit (DU/TRP). The controlling node 26 is responsible for determining which of the distributed units 22 spanning the first communication cell 20 is responsible for radio communications with the terminal device 14 at any given time (i.e. which of the distributed units are currently active distributed units for the terminal device). Typically this will be based on measurements of radio channel conditions between the terminal device 14 and respective ones of the distributed units 22. In this regard, it will be appreciated the subset of the distributed units in a cell which are currently active for a terminal device will depend, at least in part, on the location of the terminal device within the cell (since this contributes significantly to the radio channel conditions that exist between the terminal device and respective ones of the distributed units).

In at least some implementations the involvement of the distributed units in routing communications from the terminal device to a controlling node (controlling unit) is transparent to the terminal device 14. That is to say, in some cases the terminal device may not be aware of which distributed unit is responsible for routing communications between the terminal device 14 and the controlling node 26 of the communication cell 20 in which the terminal device is currently operating, or even if any distributed units 22 are connected to the controlling node 26 and involved in the routing of communications at all. In such cases, as far as the terminal device is concerned, it simply transmits uplink data to the controlling node 26 and receives downlink data from the controlling node 26 and the terminal device has no awareness of the involvement of the distributed units 22, though may be aware of radio configurations transmitted by distributed units 22. However, in other embodiments, a terminal device may be aware of which distributed unit(s) are involved in its communications. Switching and scheduling of the one or more distributed units may be done at the network controlling node based on measurements by the distributed units of the terminal device uplink signal or measurements taken by the terminal device and reported to the controlling node via one or more distributed units.

In the example of FIG. 2, two communication cells 20, 21 and one terminal device 14 are shown for simplicity, but it will of course be appreciated that in practice the system may comprise a larger number of communication cells (each supported by a respective controlling node and plurality of distributed units) serving a larger number of terminal devices.

It will further be appreciated that FIG. 2 represents merely one example of a proposed architecture for a new RAT telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architectures shown in FIGS. 1 and 2.

It will thus be appreciated the specific wireless telecommunications architecture in any given implementation is not of primary significance to the principles described herein. In this regard, certain embodiments of the disclosure may be described generally in the context of communications between network infrastructure equipment/access nodes and a terminal device, wherein the specific nature of the network infrastructure equipment/access node and the terminal device will depend on the network infrastructure for the implementation at hand. For example, in some scenarios the network infrastructure equipment/access node may comprise a base station, such as an LTE-type base station 11 as shown in FIG. 1 which is adapted to provide functionality in accordance with the principles described herein, and in other examples the network infrastructure equipment may comprise a control unit/controlling node 26, 28 and/or a TRP 22, 24 of the kind shown in FIG. 2 which is adapted to provide functionality in accordance with the principles described herein.

Figure 3:
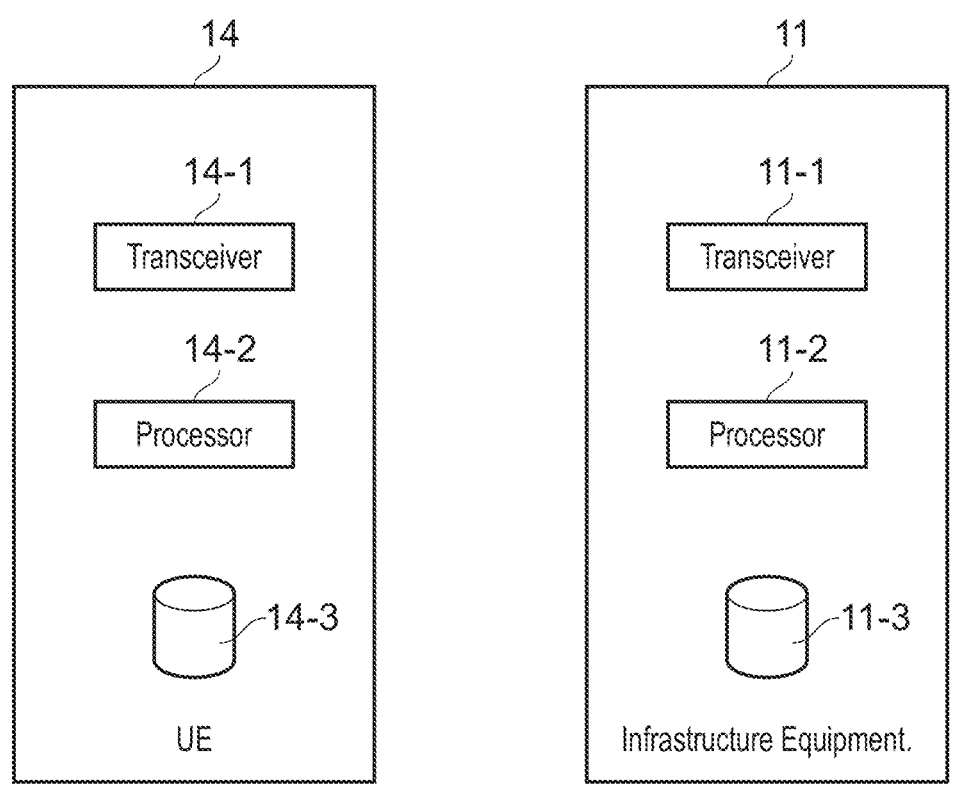
FIG. 3 shows schematically the terminal device 14 and infrastructure equipment 11 of FIG. 1.

FIG. 3 shows schematically the terminal device 14 and infrastructure equipment 11 of FIG. 1. The terminal device 14 includes a transceiver 14-1 which communicates with the infrastructure equipment 11 wirelessly. The transceiver 14-1 is controlled by processing circuitry 14-2 located within terminal device 14. The processing circuitry 14-2 may be embodied as any kind of circuitry such as an application specific integrated circuit or the like or may be a microprocessor. The processing circuitry 14-2 is itself controlled by software code which is stored on storage 14-3. The storage 14-3 is typically embodied as solid state circuitry designed to store program code.

Similarly, the infrastructure equipment 11 includes a transceiver 11-1 which communicates with the infrastructure equipment 11 wirelessly. The transceiver 14-1 is controlled by processing circuitry 14-2 located within infrastructure equipment 11. The processing circuitry 11-2 may be embodied as any kind of circuitry such as an application specific integrated circuit or the like or may be a microprocessor. The processing circuitry 11-2 is itself controlled by software code which is stored on storage 11-3. The storage 11-3 is typically embodied as solid state circuitry designed to store program code.

Figure 4:
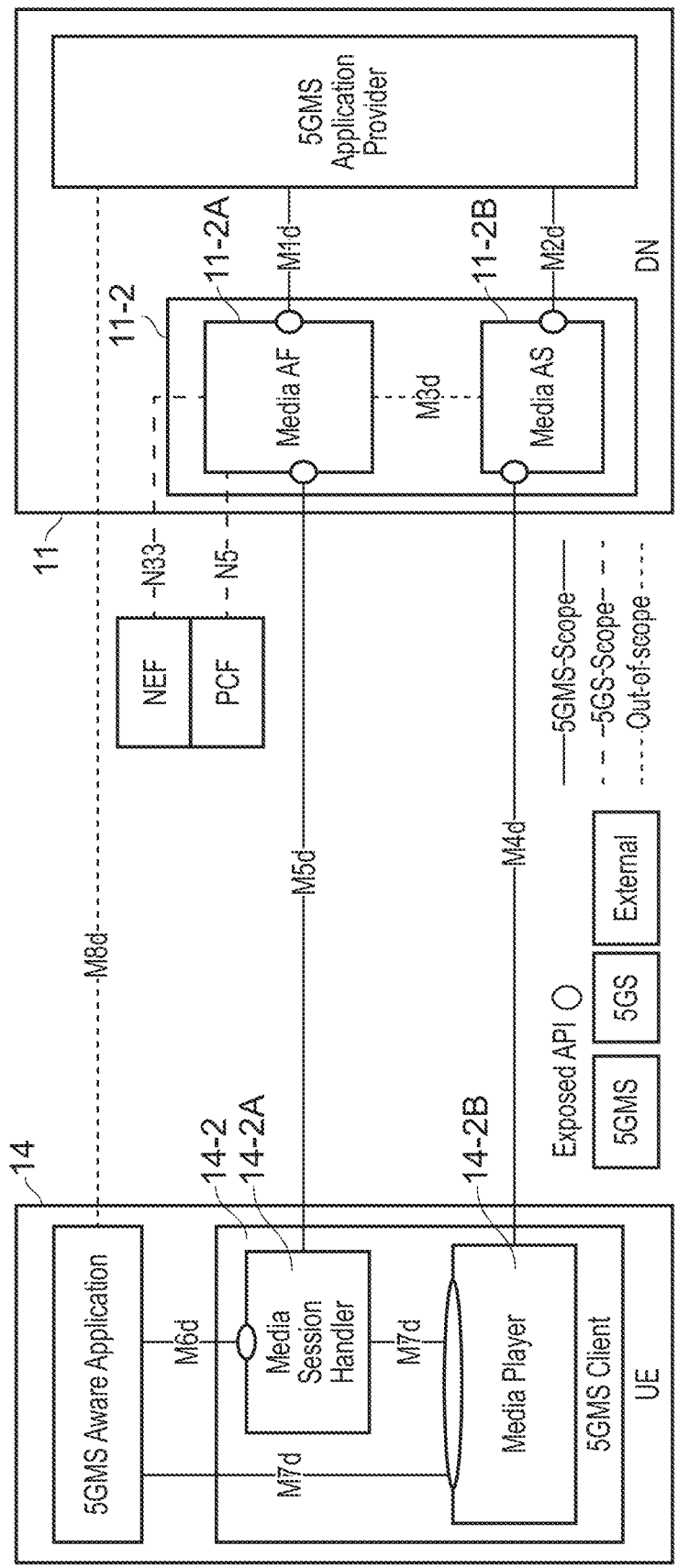
FIG. 4 schematically shows the known media architecture for unicast media downlink streaming set out in [1]

FIG. 4 schematically shows the known media architecture for unicast media downlink streaming set out in [1]. As this is a known media architecture, only pertinent sections will be explained for brevity. The 5G Media Streaming Client (5GMS client) will be run on processing circuitry 14-2 within the terminal device 14. The 5GMS receives a downlink media streaming service that and may be accessed through defined interfaces/Application Program Interfaces (APIs). The 5GMS Client contains two sub functions which will be run on processing circuitry 14-2 within the terminal device 14. The two sub-functions are a Media Session Handler 14-2A and a Media Player 14-2B. The Media Session Handler 14-2A is a function that establishes, controls and supports a media session within the UE 14 and communicates with a Media Application Function (Media AF) 11-2A running on the processing circuitry 11-2 within the infrastructure equipment 11. The Media AF 11-2A is similar to that defined in clause 6.2.10 of [2] and provides various control functions to the Media Session Handler 14-2A. The Media Player 14-2B is a function that streams the media content on the UE 14 and communicates with a Media Application Server (Media AS) 11-2B running on the processing circuitry 11-2 within the infrastructure equipment 11 and which hosts 5G media functions. It should be noted that, whilst the Media AF 11-2A and the Media AS 11-2B are shown to run on infrastructure equipment 11, this is for convenience and these are typically data network functions.

As will be apparent from FIG. 4, there are various interfaces (such as Application Program Interfaces APIs or the like) using which the various functions communicate. These are defined in [1]. However, for convenience, a brief explanation of interface M4*d*, M5*d*, M6*d* and M7*d* will be provided.

M4*d*—Media Streaming API—this is for interfaces that are exposed by the Media AS to the Media Player. This interface allows media content to be streamed. In addition, other functionality such as Digital Rights Management (DRM), Media Decoding, presentation/rendering and the like are provided over the Media Streaming Interface.

M5*d*—Media Session Handling API—this is for interfaces exposed by the Media AF to the Media Session Handler for media session handling, control and assistance. This also includes security mechanisms such as authentication and authorisation.

M6*d*—UE Media Session Handling API—this is for interfaces exposed by a Media Session Handler to an application or the like to make use of 5G Media Service functions.

M7*d*—UE Media Player API—this is for interfaces exposed by the Media Player to an application or the like and Media Session Handler to utilise the Media Player.

Figure 5:
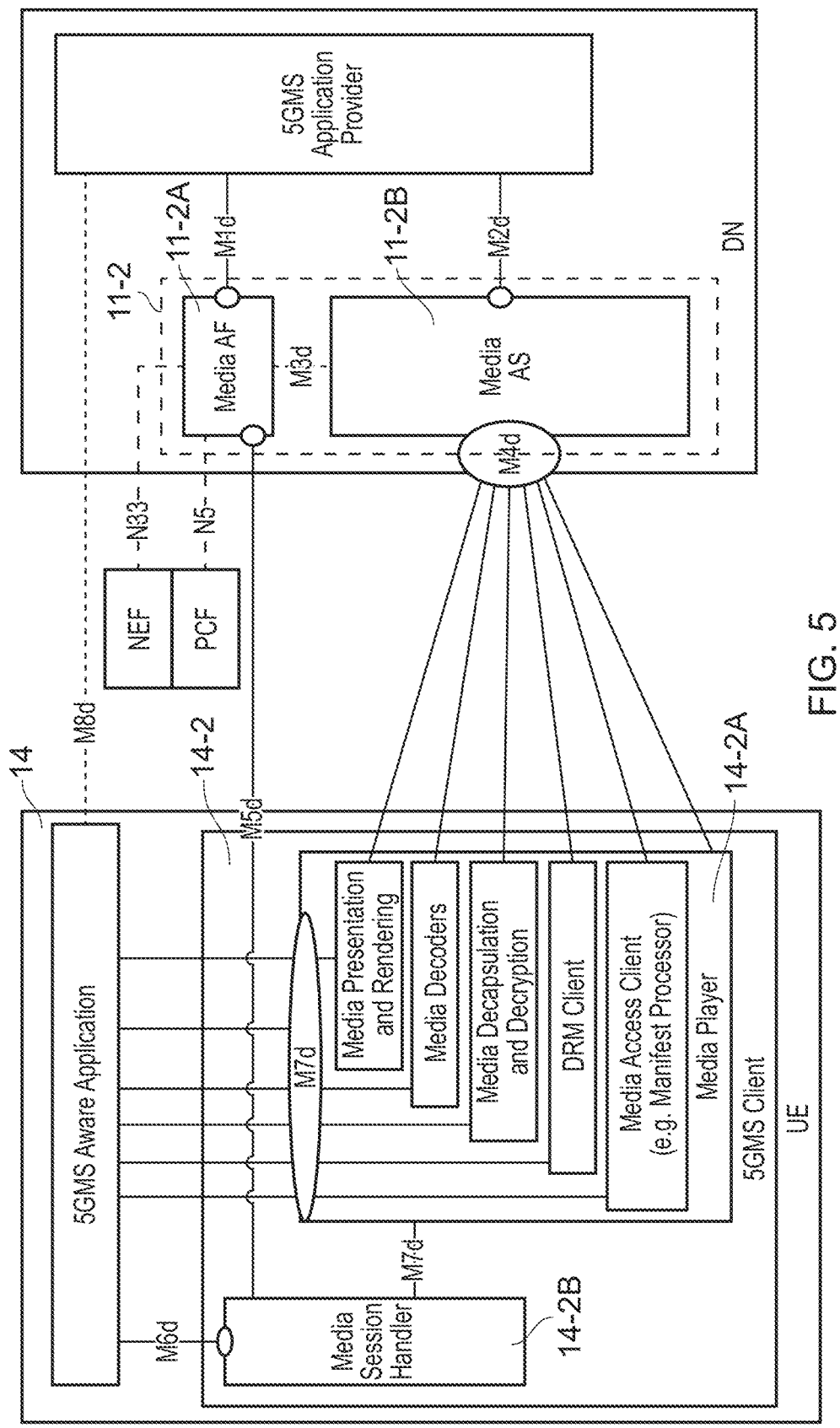
FIG. 5 shows the arrangement of FIG. 4 with more explanation of the functions within the Media Player 14-2B.

FIG. 5 shows the arrangement of FIG. 4 with more explanation of the functions within the Media Player 14-2B. In particular, and as noted above, the Media Player 14-2B within the 5G Client has functionality such as media presentation and rendering, media decoding, Media decapsulation and decryption, DRM client and Media Access Client that accesses media content such as Dynamic and Adaptive Streaming over HTTP (DASH) formatted Media Segments.

Remote Control Instructions

Figure 6:
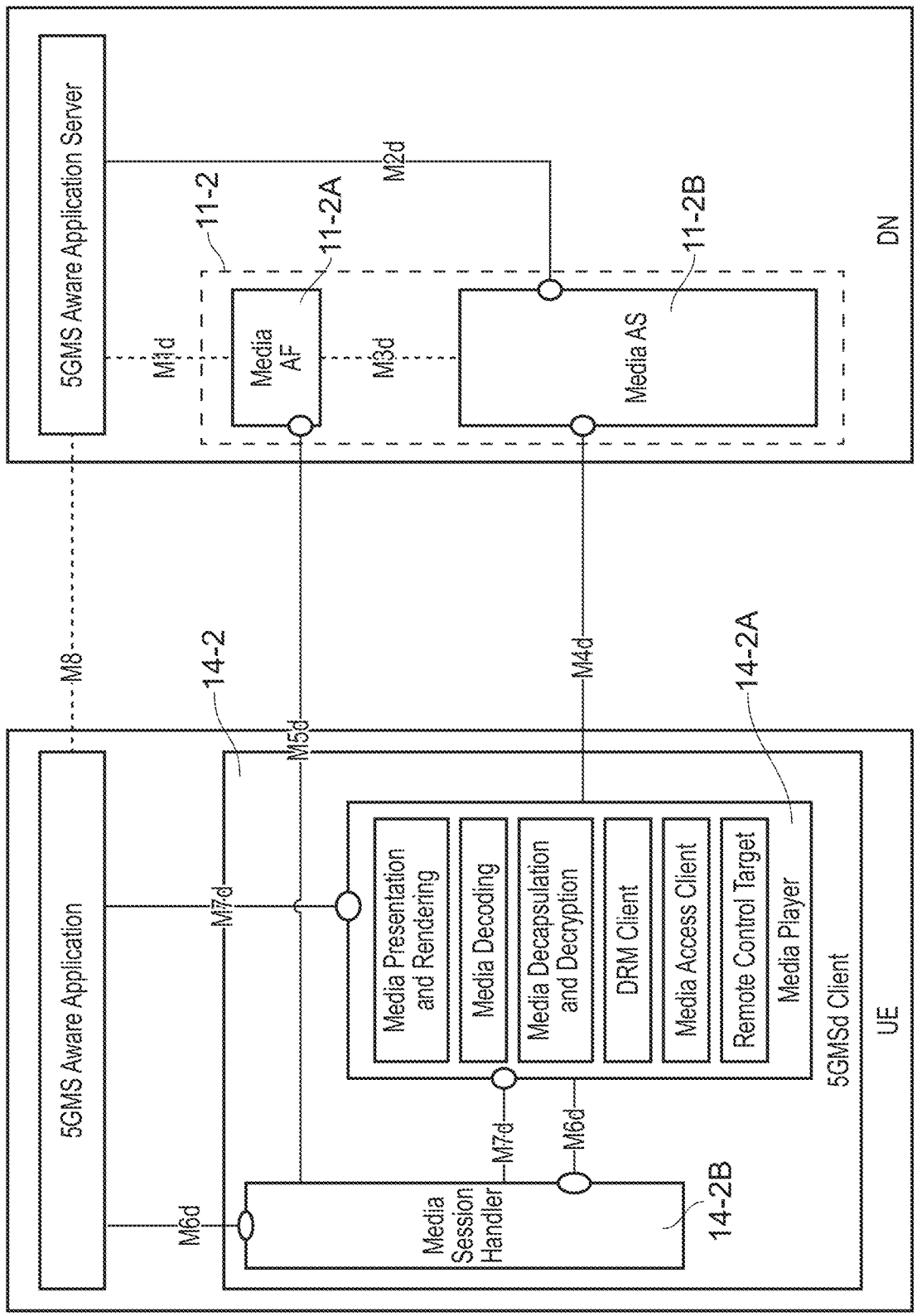
FIG. 6 shows a terminal device 11 in communication with infrastructure equipment 14 according to embodiments of the disclosure.

As noted above, one improvement that may be applied to the known arrangement of FIG. 4 is to allow provision of remote control instructions in the downlink direction. As such, FIG. 6 shows an arrangement according to embodiments of the disclosure. In particular, in FIG. 6, a terminal device 11 is shown in communication with infrastructure equipment 14 according to embodiments of the disclosure.

At present, sending remote control instructions in the downlink direction has not been envisaged in respect of 5GMS. Moreover, in order to reduce the increase of complexity of the downlink architecture, the location of the remote control instructions within the interface arrangement of the downlink architecture needs to be carefully considered. In other words, the remote control instructions need to be located within an interface that requires the least amount of re-design of the downlink architecture. The inventor has addressed this issue.

In particular, the processing circuitry 14-2 within the terminal device 14 controls the transceiver 14-2 to receive, from the infrastructure equipment 11, a media content stream via a media interface such as the Media Streaming Interface M4*d* or the Media Player Interface M7*d*; and to receive a remote control instruction via the media interface such as Media Streaming Interface M4*d* or the Media Player Interface M7*d*. This is particularly advantageous because the media interface includes the sub-functions associated with streaming media content such as Media Presentation and Rendering, Media Decoding, Media Decapsulation and Decryption, Digital Rights Management (DRM) and Media Access Client and the like. In addition, in embodiments, a Remote Control Target sub-function is added to this list of sub-functions within the Media Player. Therefore, provision of the remote control instructions as a sub-function within the media player means that the complexity of the arrangement to allow remote control instructions to be sent over the downlink is minimised.

It should be noted here that whilst in embodiments, the terminal device 14 may receive the remote control instruction from the infrastructure equipment 11 via the media interface, the disclosure is not so limited. For example, the remote control instruction may be provided via the media interface using a device that is tethered to the terminal device 14 or is at least external to the terminal device 14.

The device providing the remote control instruction may provide this remote control instruction over a physical network that is different to the 3GPP RAN network such as using WiFi or Bluetooth or the like. In this case, the device providing the remote control instructions will have an application running on the device. The remote control instructions will therefore be sent to the Media Player via the Media Player Interface M7d. In other words, the remote control instruction will be provided to the 5GMS Aware Application which will then instruct the Media Player over the Media Player Interface M7d. In other words, the remote control instruction will be provided to the Media Player by an application interface.

In embodiments, rules may be applied to the remote control instructions. This may be appropriate, although not exclusively, to remote control instructions provided via the different physical network. The interface/API may apply the rules. The DRM client may apply the rules. The interface/API may interact with the DRM client to apply the rules. The rules may block or allow certain remote control functionality. The rules may convert certain remote control functionality to apply an appropriate modification to the remote control functionality. The modification may depend on the type of terminal or the use case to which the terminal is put. The rules may depend on the particular media content or the type of media content or the formatting of the media content or the source of the media content. The particular media content, the type of media content, the formatting or source of media content may be encapsulated in metadata associated with the content. This or other metadata may be processed in order to define and/or apply the rules.

Similarly, the processing circuitry 11-2 within the infrastructure equipment 11 controls the transceiver circuitry 11-2 to send, to the terminal device, a media content stream via a media interface such as the Media Streaming Interface M4d or the Media Player Interface M7d; and to send a remote control instruction via the media interface such as Media Streaming Interface M4d or the Media Player Interface M7d.

It should be noted that remote control instructions may include a pan, zoom, tilt, record, pause or any kind of instruction that controls capture of content. Additionally, remote control instructions may include selecting content, playback, trick play (such as fast forward or rewind), pause, skip or any kind of instruction that controls playback of content. Of course the disclosure is not so limited and remote control instructions include any instructions that can be normally performed by a user of the terminal device 14 but which are, instead, provided by a different device.

The remote control instructions may be issued by the Media AS when they are necessary due to an event or condition in the Media AS. For example, during a downlink streaming session when there is an interruption at the content ingest interface to the Media AS, the Media Player run by the processing circuitry 14-2 within the terminal device 14 is stopped by a remote control instruction issued by the Media AS in order to play a still picture to inform the viewer on the terminal device 14 of the problem. This remote control instruction would be received over the Media Streaming Interface M4d.

In another embodiment, the remote control instructions may be issued by an Application (from the 5GMS Aware Application). In this case, the remote control instruction may be issued by the Application when the viewer is offered direct control capability of the media streaming content playback, for example to perform trick-play (fast forward, rewind or the like). In this instance, the terminal device 14 may include a user interface such as a touch screen or the like to receive a user input. The remote control instruction is sent from the media handling function to the media session handling function in response to the user input. This remote control instruction would be received over the Media Player Interface M7d.

In another embodiment, the remote control instructions may be issued by the Media Session Handler. In other words, the processing circuitry 14-2 in the terminal device 14 may be configured to run a media session handling function and a media stream handling function. The remote control instruction may be sent from the media stream handling function to the media session handling function using a media player interface. This may be sent at any appropriate time, for example, when events or conditions relevant to the media session occur. One example of this is when the session is terminated, the Media Player function is stopped. This remote control instruction would be received over the Media Player Interface M7d.

Figure 7A:
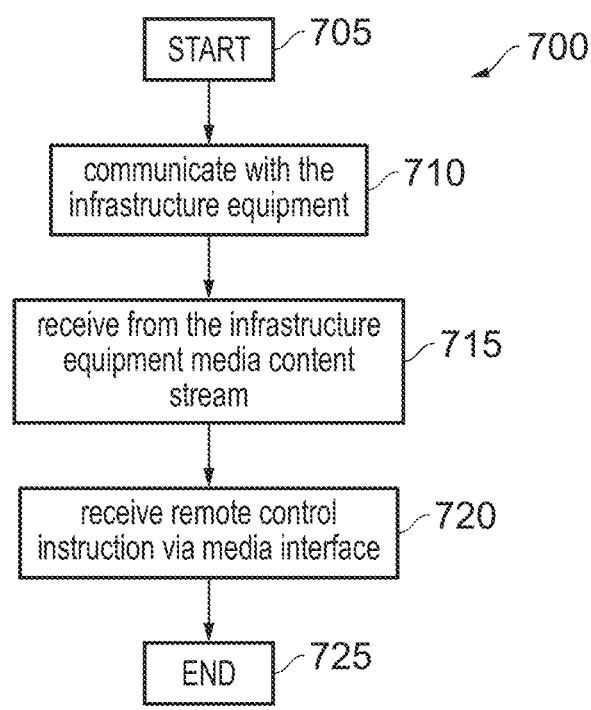
FIG. 7A shows a flow diagram 700 explaining the operation of a terminal device 14 according to embodiments of the disclosure.

Referring to FIG. 7A, a flow diagram 700 explaining an example operation of a terminal device 14 according to embodiments is shown. The process starts in step 705 and then moves to step 710. In step 710, the transceiver circuitry 14-1 communicates with the infrastructure equipment 11. The process moves to step 715 where the processing circuitry 14-2 controls the transceiver circuitry 14-1 to receive, from the infrastructure equipment 11, a media content stream via a media interface. The process then moves to step 720, where the processing circuitry 14-2 controls the transceiver circuitry 14-1 to receive a remote control instruction via the media interface. The process then moves to step 725 where the process ends.

Figure 7B:
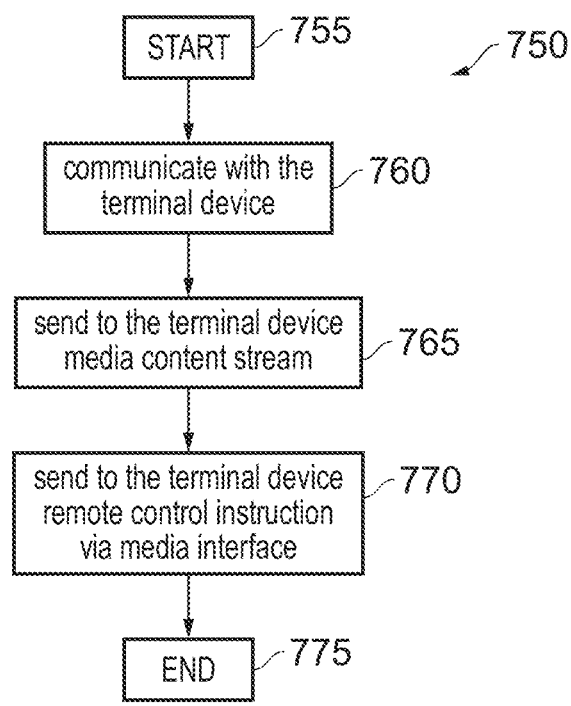
FIG. 7B shows a flow diagram 750 explaining the operation of infrastructure equipment 11 according to embodiments of the disclosure.

Referring to FIG. 7B, a flow diagram 750 explaining an example operation of infrastructure equipment 11 according to embodiments is shown. The process starts in step 755 and then moves to step 760. In step 760, the transceiver circuitry 11-1 communicates with the terminal device 14. The process moves to step 765 where the processing circuitry 11-2 controls the transceiver circuitry 11-1 to send, to the terminal device 14, a media content stream via a media interface. The process then moves to step 770, where the processing circuitry 11-2 controls the transceiver circuitry 11-1 to send a remote control instruction to the terminal device 14 via the media interface. The process then moves to step 775 where the process ends.

Unified Architecture

As noted above, the current uplink media architecture in a terminal device is very different to that of the downlink architecture. The current uplink media architecture is shown in section 4.3 "5G Media Uplink Streaming Architecture" of [1] (the content of which is hereby incorporated by reference). This current uplink media architecture is reproduced in FIG. 8 herein for convenience.

Figure 8:
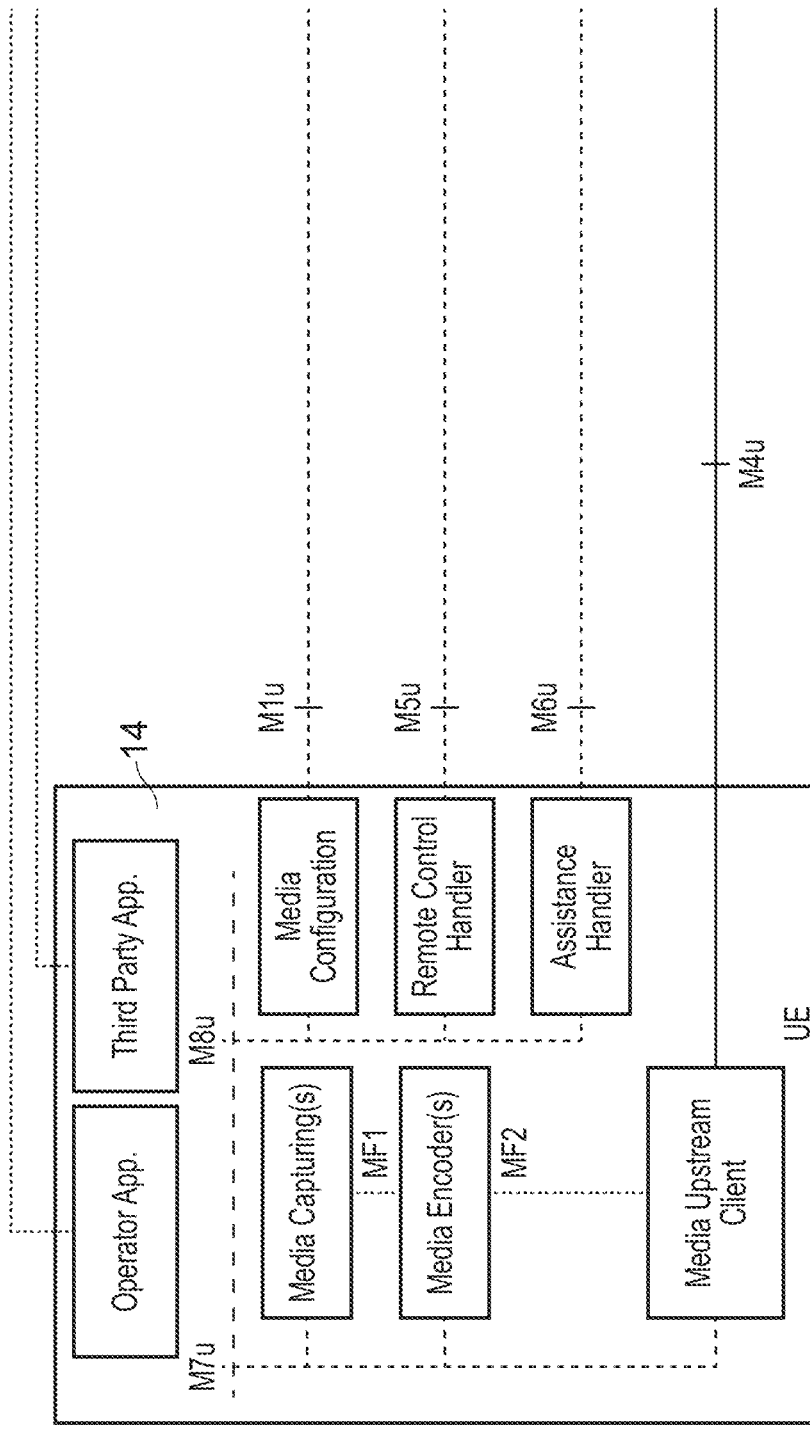
FIG. 8 shows a schematic diagram showing the known media architecture for media uplink set out in [1]

Referring to FIG. 8, the current uplink media architecture includes several sub-functions. Specifically, the current uplink media architecture includes sub-functions for Media Capturing, Media Encoding, Media Configuration, Remote Control Handling, Assistance Handling and a Media Upstream Client. The functionality of these is explained in [1] and so will not be repeated here for brevity.

As will be apparent, and as noted above, the current uplink media architecture of FIG. 8 is very different to the current downlink media architecture of FIG. 4.

It is desirable, therefore, to provide a unified architecture that may be used for both uplink and downlink communication. This reduces complexity within the terminal device.

Figure 9:
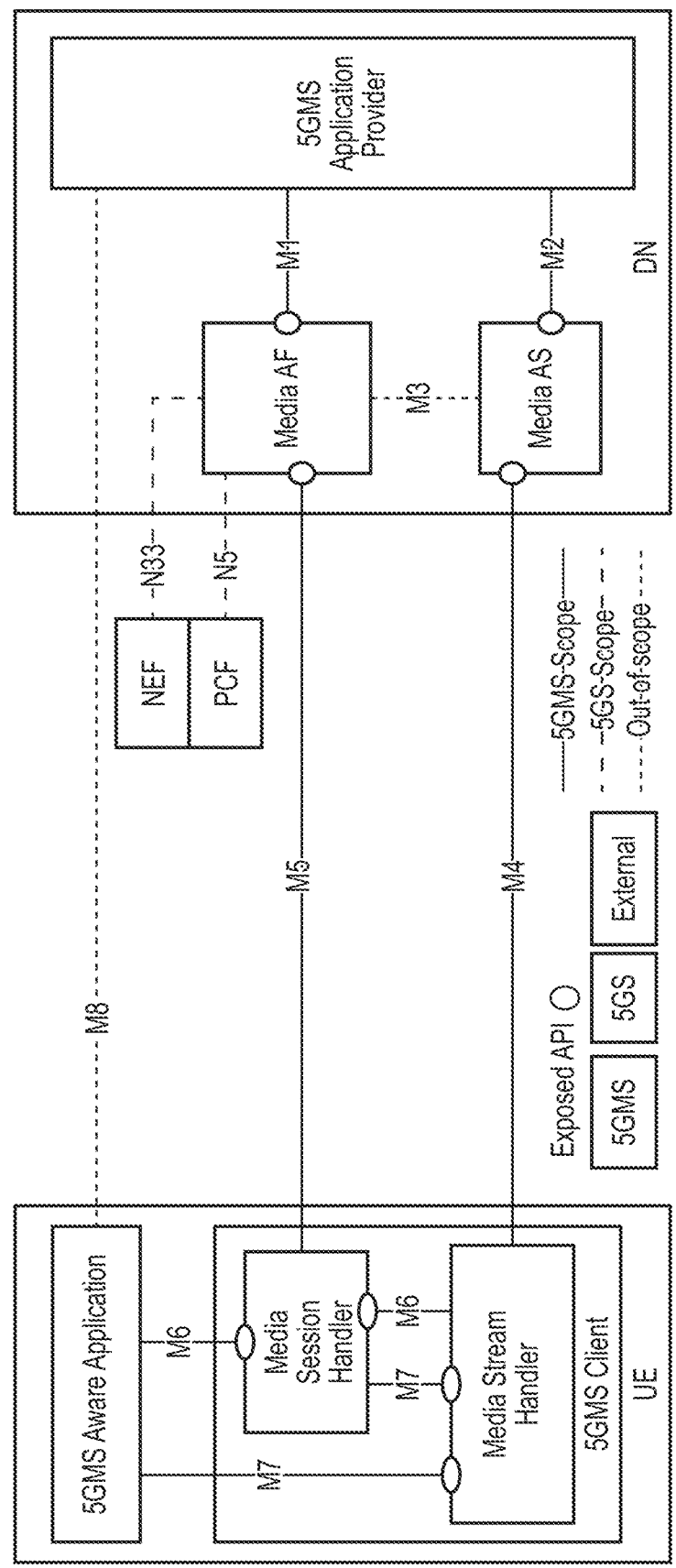
FIG. 9 shows a unified architecture according to embodiments of the disclosure that is used for both uplink and downlink communication.

FIG. 9 shows a unified architecture according to embodiments of the disclosure that is used for both uplink and downlink communication.

As will be apparent, the unified architecture of FIG. 9 is based upon the downlink architecture of FIG. 4. In particular, the unified architecture defines functional entities that perform media streaming irrespective of the direction of media stream transfer, i.e. downlink or uplink.

Of course, deployments of the 5GMSA can embody media streaming only in one direction, for example where the terminal device 14 is only able to receive media streams. In that case none of the uplink functionality needs to be implemented.

The interfaces M1-M7 may be decomposed into dedicated downlink and uplink parts, for example M5 is composed of M5$d$ for downlink functionality and M5$u$ is for uplink functionality. In other words, unified architecture may be decomposed into a logical downlink architecture and a logical uplink architecture that provides the same functionality as the separate downlink and uplink architecture described in [1].

Since M8 is left open for private usage by applications, in embodiments there may be no need to foresee dedicated decompositions of that protocol for uplink and downlink functionality.

Interface M4 carries the media streams as well as directly related messages such as player or streamer control commands and responses.

The logical downlink architecture is the same as that of FIG. 4. However, in order for the unified architecture of FIG. 9 to be used for uplink communication, there needs to be a converse logical equivalent of the current uplink architecture of FIG. 8 that is based on the downlink architecture of FIG. 4. This converse logical equivalent is shown in FIG. 9.

A mapping of the uplink functions of the current uplink architecture to the logical architecture of FIG. 10 will now be described. In other words, a mapping of the current functionality in FIG. 8 to the architecture of FIG. 10 will now be described.

Figure 10:
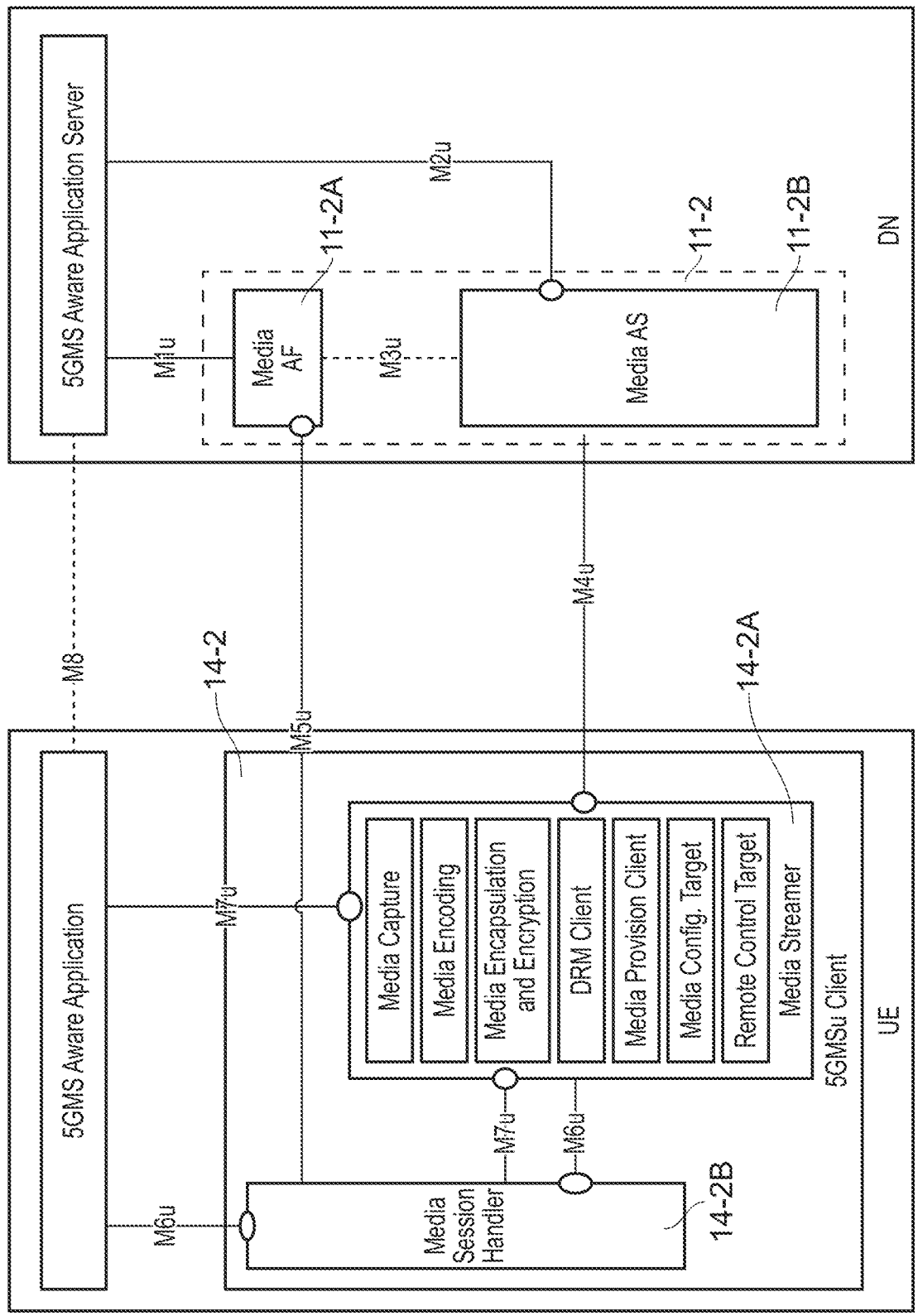
FIG. 10 shows a diagram explaining the logical architecture for uplink communication.

The function "Media Capturing(s)" of FIG. 8 maps to the function "Media Capture" in the architecture of FIG. 10.

The function "Media Encoder(s)" of FIG. 8 maps to the function "Media Encoding" in the architecture of FIG. 10.

The functions "Media Encapsulation and Encryption" and "DRM client" are not present in the existing uplink framework of FIG. 8, but they are necessary for uplink UEs that are required to deliver encrypted media streams. Therefore, these sub-functions are added in the unified architecture.

The function "Media Upstream Client" of FIG. 8 maps to the function "Media Provision Client" in the architecture of FIG. 10.

The function "Media Configuration" of FIG. 8 could also map to the function "Media Provision Client" in the architecture of FIG. 10. That is, the "Media Provision Client" function could combine the functions of "Media Upstream Client" and "Media Configuration". However, it might be of advantage to maintain the "Media Configuration" function separately, as the "Media Configuration Target" in the architecture of FIG. 10.

The function "Remote Control Handler" of FIG. 8 maps to the function "Remote Control Target" in the architecture of FIG. 10.

The function "Assistance Handler" of FIG. 8 is discarded in the architecture of FIG. 10, since the envisaged functionality belongs in the general intra-application communication interface M8.

The existing uplink framework does not include a dedicated functional entity for media session handling, even though it was foreseen to organize media stream transfers in terms of streaming sessions for uplink stream provision. Hence the architecture of FIG. 10 includes the function entity "Media Session Handler" in the terminal device 14.

As would be appreciated, although the remote control instruction may be sent over downlink according to the embodiment described with reference to FIG. 6, the remote control instruction may be equally sent over the downlink according to the unified architecture embodiment described in FIGS. 9 and 10.

Downlink Media Streaming Modes

Currently the 5GMSA is designed only for pull-mode streaming for downlink media sessions. However, it would be advantageous to perform downlink streaming sessions in push-mode, whereby the Media AF and Media AS initiate and control the media stream downlink to the UE. Furthermore, the media stream may be advantageously transported using a non-segmented format. One example of a non-segmented format is Real-Time Transport Protocol/User Datagram Protocol (RTP/UDP).

Uplink Media Streaming Modes

Currently the 5GMSA is designed only for push-mode streaming for uplink media sessions. However, it would be advantageous to perform uplink streaming sessions in pull-mode, whereby the Media AF and Media AS initiate and control the media stream uplink from the UE. Furthermore, the media stream may be advantageously transported using a non-segmented format. One example of a non-segmented format is Real-Time Transport Protocol/User Datagram Protocol (RTP/UDP).

Downlink Content Metadata

For downlink media streaming content, metadata is received by the Media Access Client sub-function within the Media Player (see FIG. 5 and FIG. 7) and provided to the 5GMS-aware application via the M7$d$ (Media Player) Interface.

Media streams are selected by the user of the 5GMS-aware application by providing the media stream entry point to the Media Player via the M7$d$ (Media Player) Interface. If no media session is in progress then the Media Player requests the Media Session Handler to set one up.

Use Cases

As noted above, the terminal device 14 may be embodied as many devices. For example, the terminal device 14 may be located in a vehicle such as a car, lorry, bus, motorbike or the like. Alternatively, the terminal device 14 may be embodied in a camera such as broadcast camera.

Indeed, other devices are envisaged. In one embodiment, the terminal device 14 according to the above embodiments may be included in digital signage or a public display system or part of such a system.

The terminal device 14 is particularly applicable to digital signage or a public display system because no cabling is required to display content to users.

The Digital Signage System (DSS) use case involves a DSS operator that can have a Service Level Agreement (SLA) with a Mobile Network Operator (MNO), who provides infrastructure equipment and media asset storage and provision facilities in the network. The infrastructure equipment uses the 5GMS to deliver media assets to the DSS UEs.

The operation of DSS screens, as a network of DSS in an embodiment of the 5GMS, offers advantages as regards the placement of the DSS including the terminal device 14. As noted above, the placement can be more flexible since no network cabling has to be provided at each DSS location, since media asset delivery and communications are performed using the wireless MNO network, which is 5GMS-enabled. The DSS including the terminal devices 14 can be located anywhere where there is access to the MNO network. Naturally, however, an electrical power source is needed for each DSS.

The DSS device can be managed as a group, each displaying the same DSS application and media asset(s), or each DSS device, or groups of DSS devices at a particular location area can execute different variants of DSS applications and display different media assets.

One particular scenario for the use of the DSS device is as an advertising scenario.

The DSS device can have local storage for common media playback, e.g. when a media stream is played in a loop. This is advantageous over the live streaming method of content delivery, since the media asset is delivered to the DSS device once and the DSS device plays the same media asset repeatedly from local storage, under the control of the 5GMS-aware application that is executing on the DSS device.

Figure 11A:
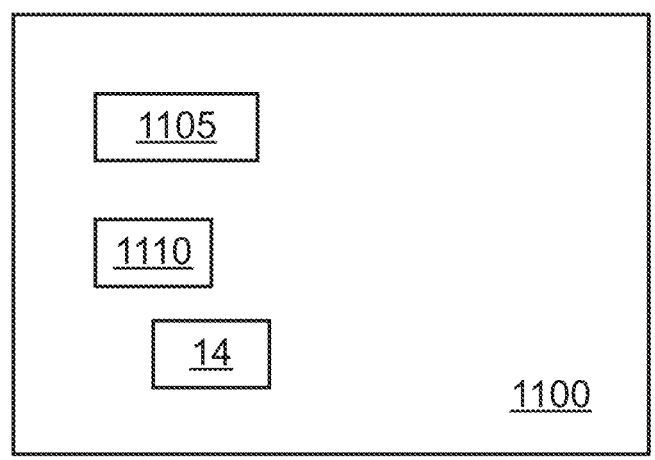
FIG. 11A shows a Digital Signage System device 1100 according to embodiments.

This is shown in FIG. 11A that shows a schematic diagram of a DSS device 1100. The DSS device 1100 includes a display 1105, storage 1110 and the terminal device 14 according to embodiments. The storage 1110 may include the content and computer program code to enable the DSS device 1100 to perform a method according to embodiments.

Figure 11B:
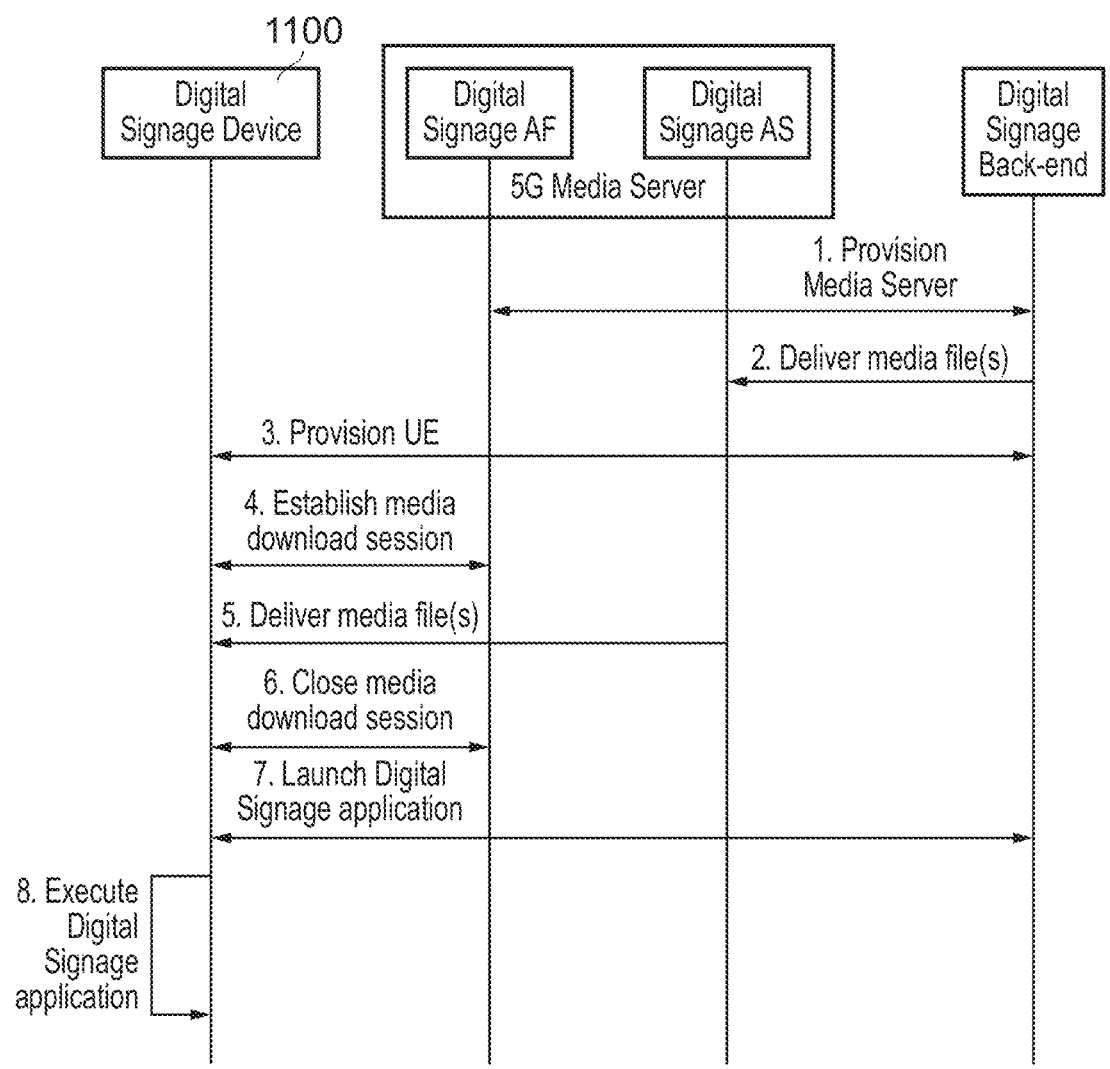
FIG. 11B shows a flow diagram explaining a Digital Signage System according to embodiments of the disclosure.

FIG. 11B shows a signal diagram explaining the message flow between the DSS device 1100 to the network.

Step 1. The DSS back-end provisions the 5G Media Server within the MNO core network. This can involve gaining access to the MNO facilities via registration and authentication, then delivering the media assets that can be used by the DSS device 1100. Many DSS devices 1100 can be managed by a single 5G Media Server in the MNO network, and the DSS can deploy many 5G Media Servers, as dictated by the network topography and locations of the DSS devices 1110.

Step 2. Media file assets are delivered to the 5GMS Application Server, where they are stored, ready to be used as needed.

Step 3. The DSS devices 1100 are provisioned within the realm of the DSS operator. Typically, a DSS application environment runs on the DSS devices 1100. This can be configured and controlled by the DSS back-end system. This communication path maps to interface M8 in the 5GMS. This will be the usual case when the MNO is not acting as DSS operator.

Step 4. When the DSS device 1100 starts operation of a particular DSS application, provided by the DSS back-end, or pre-loaded on the DSS device 1100, it establishes a media handling session with the Media AF in the MNO, as instructed by the DSS application that executes in the DSS device 1100. This operation uses media session handling interface M5 or M5$d$ in the 5GMS.

Step 5. When the session has been established the DSS device 1100 can download the media asset file(s) that it needs, from the Digital Signage AS. This operation uses the media streaming interface M4 or M4$d$ in the 5GMS.

Step 6. When all needed media files have been transferred the media handling session with the Media AF is closed.

Step 7. The DSS back-end can command the DSS device 1100 to launch and execute a particular application to run on the DSS device 1100. Alternatively the DSS does this autonomously after some pre-defined sequence as programmed in the DSS device 1100.

Step 8. The DSS application executes in the DSS device 1100, including playback of one or more media assets stored locally in the storage 1110 of the DSS device 1100. Media asset playback is executed via the corresponding API component of media player interface M7 or M7$d$ in the 5GMS. Members of the public passing by notice the media and might be attracted by the content or message provided.

Figure 11C:
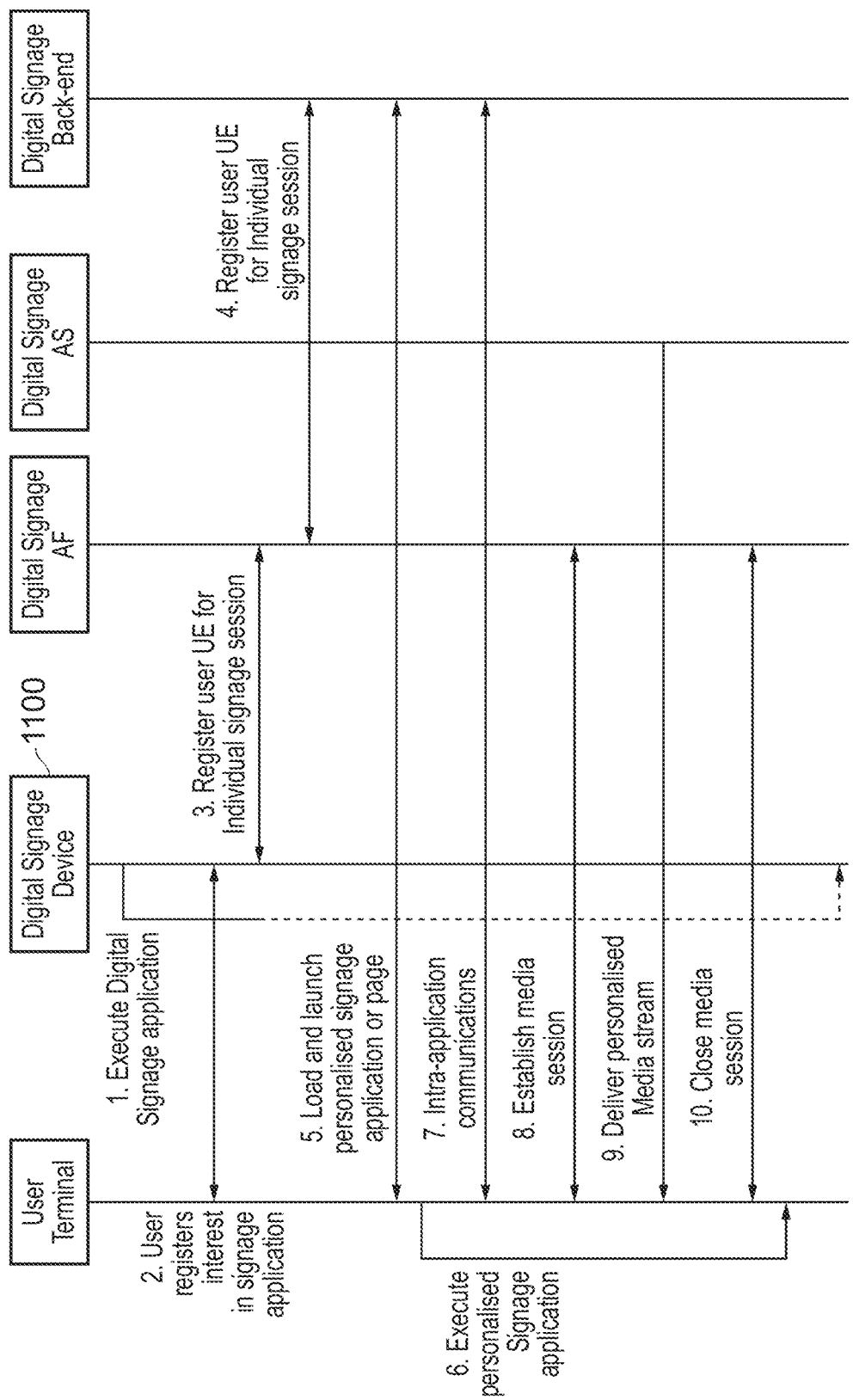
FIG. 11C shows a signal diagram explaining an example message flow between a DSS device 1100, the user's terminal device and the network.

This arrangement may be used to provide personalised advertising and relationship management so that personalised connections may be handed over to the user's terminal device. This scenario is shown in FIG. 11C shows a signal diagram explaining an example message flow between the DSS device 1100, the user's terminal device, and the network.

Step 1. The DSS application executes in the DSS device 1100 and a media asset is being displayed.

Step 2. The user is attracted to the displayed content and registers interest with the DSS device 1100 by way of a mechanism of connecting locally with the DSS device, either directly via a communication interface such as Wi-Fi or Bluetooth. Alternatively this can be performed via the mobile network, and with location information in combination with some pre-loaded application on the user's terminal device that enables the DSS system to acknowledge the user's interest and establish a media session with the user's terminal device. Step 2 takes into account data privacy requirements, for example that the user has previously given consent to such registrations with the DSS.

Step 3: The DSS device and/or its application registers the user's interest to the function on the Digital Signage AF that is able to retrieve the user terminal connection information from the core network.

Step 4. The Digital Signage AF provides the user terminal connection information and if necessary the DSS device information.

Step 5. The DSS back-end establishes individualised contact with the user terminal, for example by loading and launching an application or loading a browser page or similar on the user terminal, for example to invite personalised interaction.

Step 6: The personalised user interaction takes place at the user terminal.

Step 7: Data is exchanged with the DSS back-end as necessary for the application or browser page being accessed.

Step 8: A media playback session is established with the digital signage AF in the network when the interaction implies the need to receive some media stream from the network. An uplink media session can also be established, for example if a video message is to be sent to the DSS.

Step 9: the DSS AS delivers the selected or implicitly selected media stream, which is played on the user terminal.

Step 10: When media playback (or upload, as appropriate) is no longer required, the media session is closed.

Further, the DSS device 1100 may be controlled to terminate the signage application and perform real-time streaming of a new media asset under the control of the DSS back-end function, or be controlled to load and execute a new application to do so. This can be done when live transmissions are broadcast using the DSS, for example an important sports event, or a public service announcement or emergency warning. In this scenario the DSS can incorporate a live broadcast feed by using the 5GMS, by performing ingest of the live broadcast stream at the Media AS, and performing the necessary session handling and control functions via the Media AF.

Those skilled in the art would appreciate that the method shown by FIGS. 7A and 7B may be adapted in accordance with embodiments of the present technique. For example, other preliminary, intermediate, or subsequent steps as described herein may be included in the method, or the steps may be performed in any logical order.

Though embodiments of the present technique have been described largely by way of the example communications system shown in FIG. 6, it would be clear to those skilled in the art that they could be equally applied to other systems to those described herein. Furthermore, to the extent that the various arrangements described herein are described individually, these can be combined with any other arrangement described herein providing the two do not contradict one another.

Those skilled in the art would further appreciate that such infrastructure equipment and/or communications devices as herein defined may be further defined in accordance with the various arrangements and embodiments discussed in the preceding paragraphs. It would be further appreciated by those skilled in the art that such infrastructure equipment and communications devices as herein defined and described may form part of communications systems other than those defined by the present disclosure.

The following numbered paragraphs provide further example aspects and features of the present technique:

1. A terminal device comprising:
   transceiver circuitry configured to communicate with infrastructure equipment; and
   processing circuitry configured to control the transceiver circuitry to:
   receive, from the infrastructure equipment, a media content stream via a media interface; and
   receive a remote control instruction via the media interface.
2. A terminal device according to clause 1, wherein the processing circuitry is configured to control the transceiver circuitry to: receive the remote control instruction from the infrastructure equipment via the media interface.
3. A terminal device according to clause 1 or 2, wherein the processing circuitry is configured to run a media session handling function and a media stream handling function, wherein the remote control instruction is sent from the media session handling function to the media stream handling function using a media player interface.
4. A terminal device according to clause 3 comprising a user interface configured to receive a user input, wherein the remote control instruction is sent from the processing circuitry to the media stream handling function in response to the user input.
5. A terminal device comprising:
   transceiver circuitry configured to communicate with infrastructure equipment; and
   processing circuitry configured to control the transceiver circuitry to:
   receive, from the infrastructure equipment, a media content stream via a media interface; and
   receive a remote control instruction via an application interface.
6. A digital signage device including a display and a terminal device according to any preceding clause.
7. Infrastructure equipment comprising:
   transceiver circuitry configured to communicate with a terminal device; and
   processing circuitry configured to control the transceiver circuitry to:
   send, to the terminal device, a media content stream via a media interface; and
   send, to the terminal device, a remote control instruction via the media interface.
8. A method of operating a terminal device, the method comprising:
   receiving, from infrastructure equipment, a media content stream via a media interface; and
   receiving a remote control instruction via the media interface.
9. A method according to clause 8, comprising: receiving the remote control instruction from the infrastructure equipment via the media interface.
10. A method according to clause 8 or 9, comprising running a media session handling function and a media stream handling function, wherein the remote control instruction is sent from the media session handling function to the media stream handling function using a media player interface.
11. A method according to clause 10 comprising: receiving, a user input, wherein the remote control instruction is sent from the processing circuitry to the media stream handling function in response to the user input.
12. A method of operating a terminal device, the method comprising:
   receiving, from infrastructure equipment, a media content stream via a media interface; and
   receive a remote control instruction via an application interface.
13. A method of operating infrastructure equipment comprising:
   sending, to a terminal device, a media content stream via a media interface; and
   sending, to the terminal device, a remote control instruction via the media interface.
14. A computer program comprising computer readable code, which, when loaded onto a computer configures the computer to perform a method according to any one of clauses 8 to 13.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may be described in connection with particular embodiments, one skilled in the art would recognise that various features of the described embodiments may be combined in any manner suitable to implement the technique.

REFERENCES

[1] 3GPP TS 26.501 V16.1.0 "5G Media Streaming (5GMS) General Description and Architecture"
[2] 3GPP TS 23.501 "System Architecture for the 5G System"
[3] Holma H. and Toskala A, "LTE for UMTS OFDMA and SC-FDMA based radio access", John Wiley and Sons, 2009.

The invention claimed is:

1. A terminal device configured to operate in a wireless communication system, the terminal device comprising:
a media session handler configured to interface with an application of the terminal device; and
a media streamer configured to interface with the application of the terminal device, wherein
the media session handler is configured with a first uplink interface to transmit data to a media application function of an infrastructure equipment of the wireless communication system, wherein an API is exposed by the media application function to the media session handler, wherein the media session handler is configured to transmit data to the media application function executed by an infrastructure equipment via the first uplink interface,
the media session handler is configured with a first downlink interface to receive data from the media application function of the infrastructure equipment,
the media streamer is configured with a second uplink interface to transmit data to a media application server of the infrastructure equipment, and
the media streamer is configured with a second downlink interface to receive data from the media application server of the infrastructure equipment,
wherein uplink media streaming is performed via the first uplink interface,
wherein the media streamer is configured to encapsulate media data for transmission via the second uplink interface.

2. The terminal device of claim 1, wherein
the media session handler is configured to establish, control and support a media session within the terminal device.

3. The terminal device of claim 1, wherein
the media streamer is configured to stream media content on the terminal device.

4. The terminal device of claim 1, wherein
the media session handler is configured to receive data from the media application function executed by the infrastructure equipment via the first downlink interface.

5. The terminal device of claim 1, wherein
the media streamer is configured to transmit data to the media application server executed by the infrastructure equipment via the second uplink interface.

6. The terminal device of claim 1, wherein
the media streamer is configured to receive data from the media application server executed by the infrastructure equipment via the second downlink interface.

7. The terminal device of claim 1, further comprising:
a media session handling application program interface (API) configured to receive data transmitted from the application to the media session handler.

8. The terminal device of claim 1, further comprising:
a media streamer application program interface (API) configured to receive data transmitted from the application to the media streamer.

9. The terminal device of claim 1, further comprising:
a media session handling application program interface (API) configured to receive data transmitted from the media streamer to the media session handler.

10. The terminal device of claim 1, further comprising:
a media streamer application program interface (API) configured to receive data transmitted from the media session handler to the media streamer.

11. The terminal device of claim 1, wherein
the media session handler and media streamer-player are configured with distinct interfaces between each other for receiving information.

12. The terminal device of claim 11, further comprising:
circuitry configured to control transmission over the distinct interfaces dependent upon whether an uplink or downlink communication is made with the infrastructure equipment between the media session handler and/or media stream handler.

13. The terminal device of claim 1, wherein
the media streamer includes a media presentation and rendering subfunction configured to present media received from the infrastructure equipment via the second downlink interface.

14. The terminal device of claim 1, wherein
the media streamer includes a media decoder subfunction configured to decode media received from the infrastructure equipment via the second downlink interface.

15. The terminal device of claim 1, wherein
the media streamer includes a media decryption subfunction configured to decrypt media received from the infrastructure equipment via the second downlink interface.

16. The terminal device of claim 1, wherein
the media streamer includes digital rights management (DRM) subfunction configured to provide a content protection mechanism using unique key management and key delivery system, policy enforcement and entitlement check.

17. The terminal device of claim 1, wherein
the media streamer includes a media access client subfunction configured to access dynamic adaptive streaming over HTTP (DASH) formatted media segments received from the infrastructure equipment via the second downlink interface.

18. The terminal device of claim 1, wherein
the media streamer is configured to perform media streaming, via the second downlink interface, in a push mode in which the infrastructure equipment initiates and controls transmission of the media stream to the terminal device, and
a format of the media stream is Real-Time Transport Protocol/User Datagram Protocol (RTP/UDP).

19. The terminal device of claim 1, wherein
the media streamer is configured to perform media streaming, via the second uplink interface, in a pull mode in which the infrastructure equipment initiates and controls transmission of the media stream to the terminal device, and a format of the media stream is Real-Time Transport Protocol/User Datagram Protocol (RTP/UDP).

20. A terminal device configured to operate in a wireless communication system, the terminal device comprising:
circuitry configured to
execute a media session handler function configured to interface with an application of the terminal device; and
execute a media streamer function configured to interface with the application of the terminal device, wherein
the media session handler function is configured with a first uplink interface to transmit data to a media application function of an infrastructure equipment of the wireless communication system, wherein an API is exposed by the media application function to the media session handler, wherein the media session handler is configured to transmit data to the media application function executed by an infrastructure equipment via the first uplink interface,
the media session handler function is configured with a first downlink interface to receive data from the media application function of the infrastructure equipment,
the media streamer function is configured with a second uplink interface to transmit data to a media application server of the infrastructure equipment, and
the media streamer function is configured with a second downlink interface to receive data from the media application server of the infrastructure equipment,
wherein uplink media streaming is performed via the first uplink interface,
wherein the media streamer is configured to encapsulate media data for transmission via the second uplink interface.

21. A non-transitory computer-readable medium including computer program instructions, which when executed by circuitry of a terminal device configured to operate in a wireless communication system, causes the terminal device to:
execute a media session handler configured to interface with an application of the terminal device; and
execute a media streamer configured to interface with the application of the terminal device, wherein
the media session handler is configured with a first uplink interface to transmit data to a media application function of an infrastructure equipment of the wireless communication system, wherein an API is exposed by the media application function to the media session handler, wherein the media session handler is configured to transmit data to the media application function executed by an infrastructure equipment via the first uplink interface,
the media session handler is configured with a first downlink interface to receive data from the media application function of the infrastructure equipment,
the media streamer is configured with a second uplink interface to transmit data to a media application server of the infrastructure equipment, and
the media streamer is configured with a second downlink interface to receive data from the media application server of the infrastructure equipment,
wherein uplink media streaming is performed via the first uplink interface,
wherein the media streamer is configured to encapsulate media data for transmission via the second uplink interface.

22. A method performed by a terminal device configured to operate in a wireless communication system, the method comprising:
executing a media session handler configured to interface with an application of the terminal device; and
executing a media streamer configured to interface with the application of the terminal device, wherein
the media session handler is configured with a first uplink interface to transmit data to a media application function of an infrastructure equipment of the wireless communication system, wherein the media session handler is configured to transmit data to the media application function executed by an infrastructure equipment via the first uplink interface,
the media session handler is configured with a first downlink interface to receive data from the media application function of the infrastructure equipment, wherein an API is exposed by the media application function to the media session handler,
the media streamer is configured with a second uplink interface to transmit data to a media application server of the infrastructure equipment, and
the media streamer is configured with a second downlink interface to receive data from the media application server of the infrastructure equipment,
wherein uplink media streaming is performed via the first uplink interface,
wherein the media streamer is configured to encapsulate media data for transmission via the second uplink interface.

23. The terminal device of claim 1, wherein the first uplink interface provides the media session handler with uplink media session control information including media session authentication.

24. The terminal device of claim 23, wherein the media session authentication is provided via the API exposed by the media application function to the media session handler to authenticate a media session of the terminal device.

25. The terminal device of claim 1, wherein uplink media streaming is performed via the first uplink interface, in a pull mode, wherein the infrastructure equipment initiates and controls the media stream uplink from the terminal device.

* * * * *